United States Patent Office 2,879,295
Patented Mar. 24, 1959

2,879,295
CONTINUOUS PRODUCTION OF CYCLOHEXANOL AND CYCLOHEXANONE

Guenter Poehler and Otto Stichnoth, Ludwigshafen (Rhine), Germany, assignors to Badische Anilin- & Soda-Fabrik Aktiengesellschaft, Ludwigshafen (Rhine), Germany No Drawing. Application August 6, 1956
Serial No. 602,471

Claims priority, application Germany August 16, 1955

4 Claims. (Cl. 260—586)

This invention relates to an improved process for the continuous production of cyclohexanol and cyclohexanone by the reaction of cyclic amines of which the amino group is attached to at least a six-membered carbon ring with compounds containing hydroxyl groups in the presence of hydrogenation catalysts, if desired in the presence of hydrogen, with extensive utilization and return of the unreacted amine. In particular it relates to a process in which, in addition to the unreacted amines which are distilled off, compounds containing amines are recovered from the distillation residue of the reaction product and returned to the synthesis.

It is known that cyclohexanol and cyclohexanone can be prepared by treating cyclohexylamine or aniline in the presence of hydrogenation catalysts with water, if desired in the presence of hydrogen, at elevated temperature. This method can be carried out in the gas phase or liquid phase, if necessary under increased pressure. It is a disadvantage that in continuous methods of operation the conversion is incomplete by a single passage of the initial amine through the reaction zone and that upon returning the amine a rapid fall in the activity of the catalysts takes place.

It is an object of the present invention to return the nitrogenous distillation residue to the synthesis after working up the reaction product in order thereby to avoid a waste of initial materials. A further object is to maintain the activity of the catalyst thereby. Another object is to add the nitrogenous residue in such a form that the activity of the catalyst remains unimpaired even over a long period of time. Yet another object is to maintain the life and activity of the catalyst and to achieve high yields of cyclohexanol and cyclohexanone by extensive utilization of the unreacted amine distilled off from the reaction product and the amine-containing compounds contained in the distillation residue, by return.

We have now found that this can be achieved, the problem can be solved and cyclohexanol and cyclohexanone obtained without the said disadvantages of the prior methods occurring upon return of the amines, by reaction of cyclic amines of which the amino group is attached to at least a six-membered carbon ring with compounds containing hydroxyl groups, in particular water, in the presence of hydrogenation catalysts and, insofar as the carbon ring attached to the amino group is unsaturated, with the addition of hydrogen, if necessary under pressure, by distilling off from the reaction product cyclohexanol, cyclohexanone and if desired unreacted amine, splitting up the distillation residue by steam distillation into a distillate containing cyclohexanone and amine and a residue, and returning the distillate to the synthesis, advantageously together with the recovered amine from the first distillation.

We have further found that valuable nitrogenous products are recovered and can also be returned to the synthesis without impairing the activity of the catalyst, by subjecting the residue from the steam distillation to a further fractional distillation.

As initial materials there come into question, in addition to the especially suitable amines such as cyclohexylamine and aniline, also for example dicyclohexylamine, phenylcyclohexylamine, diphenylamine as well as mixtures of the same, in particular those which are obtained by the catalytic hydrogenation of aniline.

The process is carried out for example by leading the amine with water or another compound containing at least one hydroxyl group, as for example a low aliphatic alcohol, such as methanol, ethanol or propanol, if necessary with an addition of hydrogen in cases when the initial amine contains an unsaturated or aromatic carbon ring, at temperatures between about 150° to 400° C., advantageously between about 160° and 220° C., over a hydrogenation catalyst. The preferential formation of cyclohexanol at lower temperatures undergoes a displacement towards cyclohexanone with increasing temperature. If necessary, or when it is desired to achieve a high throughput, the reaction may be carried out at increased pressure, as for example at 2 to 300 atmospheres or at higher pressures. While the reaction requires the addition of hydrogen when using unsaturated or aromatic nuclear amines, as for example aniline or diphenylamine, the addition of hydrogen can be dispensed with when reacting saturated cycloaliphatic amines.

The most suitable amount of water or compound containing a hydroxyl group is more than that theoretically necessary. It is advantageous to use at least 1½ times the theoretical amount. Although there is no upper limit, it is preferred in general not to use more than 10 times the weight of the amine used.

As catalysts there are used catalysts which are known for hydrogenation reactions, as for example the metals of the 5th to 8th groups and the 1st subgroup of the periodic system of the elements, as well as their oxides and sulphides. The catalysts may be used as such or after application to carriers, as for example pumice, silicic acid, silicates, bleaching earths, active aluminas or bauxite. They may be rigidly arranged in the reaction chamber or may be present in a moving state. For example when working in the gase phase, the catalyst may be moved gradually through the reaction zone in the form of a moving bed, or may be fluidized by introduced gases, as for example hydrogen or vapours, for example steam or amine vapours. The catalyst may be withdrawn from the reaction zone with the gases and vapours, or/and withdrawn at the lower end of the dense catalyst phase.

The reaction product withdrawn from the reaction zone is distilled in the usual way, if necessary after its condensation. Cyclohexanol thereby passes over. Cyclohexanone forms with the unreacted primary amine an azomethine-like compound which remains in the sump during the distillation. The components present in excess distill over. The distillation residue is then subjected to a steam distillation. There is thus a far-reaching splitting up of the high boiling point nitrogenous compounds, whereby these are converted into primary amines and cyclohexanone, and entrained by the stream of steam. The amount of steam is chosen so that an azeotropic mixture consisting of pure primary amine, cyclohexanone and water passes over as distillate.

It is advantageous to carry out the steam distillation in a column, for example one with about 30 plates or more. It is especially preferred to work by introducing the residue to be treated from the previous distillation into the upper part of the column, for example in the upper third. In this way the product leaving at the top is selectively extracted well by the liquid material to be treated. In order further to enhance the action of this extractive distillation, solvents may also be added, for example advantageously those which can be taken from the process itself.

The distillate consisting of primary amines, cyclohexanone and water is led back into the synthesis, advantageously together with the unreacted initial amine of the first working up stage.

The mixture arising as a residue from the steam distillation can if desired be further fractionally distilled. There is thereby obtained a distillate fraction consisting in part of high boiling point nitrogenous products which can also be returned to the synthesis. The small distillation residue then remaining consists of high boiling resinous products practically free from nitrogen.

The following examples will further illustrate this invention but the invention is not restricted to these examples. The parts specified are parts by weight.

Example 1

In a circulating stream of hydrogen of 6,000 cubic metres which is heated up in a preheater to 180° C. there are vaporized 1,000 kilograms of a mixture of primary and secondary amines obtained by the hydrogenation of aniline together with the amines recovered as described below. The vapour mixture passes into the reaction chamber at 160° C. The reaction chamber is charged with 100 cubic metres of a nickel catalyst which is applied to pumice. At the same time steam is supplied to the reaction chamber in such an amount that the weight ratio of amine to water is 1:4. The reaction product is condensed, separated from gaseous and condensed water and distilled at atmospheric pressure, the cyclohexanol, cyclohexanone and unreacted primary amine distilling over. With reference to the amount by weight of reaction product to be distilled, there are obtained as distillate 70% of this amount of cyclohexanol and 10 to 15% of primary amines, the residue being 15 to 20% and consisting of products boiling higher than 200° C.

The distillation residue in an amount of 1,000 kilograms is led per hour into the space between the uppermost plates in a column which contains 40 plates in all, while 600 kilograms of steam at 100° C. are led into the bottom of the column. The vapours ascending in the column, which are extracted by the introduced liquid, escape at the top of the column at a temperature of 96.5° C. They consist of an azeotropically distilling mixture of cyclohexanone, primary amines and water. This distillate is led back into the synthesis together with the amine recovered in the first working up stage. There remain 400 kilograms as a residue.

The catalyst undergoes no detectable fall in activity even after six months.

If, under otherwise identical conditions of operation, cyclohexanol and cyclohexanone are removed from the withdrawn reaction product and the remaining fraction is returned directly to the synthesis, the catalyst activity falls by 30 to 35% even after 3 days.

Example 2

The procedure of Example 1 is followed but the residue obtained after the steam distillation is subjected to a further fractional distillation. There is obtained as distillate a fraction of nitrogenous products consisting predominantly of dicyclohexylamine. As a residue there remain nitrogen-free condensation products in an amount of from 1 to 2% of the reaction product.

If the amino compounds thus recovered are returned to the synthesis with corresponding reduction in the amount of freshly supplied amine, no decreasing of the catalyst can be detected after six months.

Example 3

The mixture of primary and secondary amines obtained by the hydrogenation of aniline is led over a catalyst consisting of silicic acid and 10% of copper together with the recovered amines described below and steam in the weight ratio 1:2 at 250° C. The condensed reaction product freed from water is distilled under reduced pressure. With reference to the amine introduced there are obtained about 82% of cyclohexanone which contains 20% of cyclohexanol.

The residue obtained by this distillation is led in between the uppermost plates of a column with 50 plates, while steam at 100° C. is introduced into the lower end of the column as described in Example 1. The vapours escape at the upper end of the column. They consist of an azeotropically distilling mixture of cyclohexanone, primary amines and water. This distillate is returned to the catalytic process together with the amine recovered in the first working up stage.

The catalyst undergoes no aging in activity even after 7 months.

What we claim is:

1. In a method for the continuous manufacture of cyclohexanol and cyclohexanone by reacting water with a member of the group consisting of aniline and primary and secondary amines obtainable by the catalytic hydrogenation of aniline and mixtures thereof in a reaction zone in the presence of a hydrogenating catalyst and hydrogen at a temperature of about 150° to 400° C., separating the reaction mixture from the catalyst and distilling said mixture after the removal of the remaining gaseous compounds by cooling, thereby leaving a distillation residue, the improvement which comprises treating the said distillation residue with steam and recycling the steam distillate to said reaction zone.

2. Method in accordance with claim 1 including treating the distillation residue remaining after the last mentioned distillation with steam thereby to obtain a further distillate, combining said further distillate with the first mentioned steam distillate and recycling the same to the reaction zone.

3. In a method for the continuous manufacture of cyclohexanol and cyclohexanone by reacting water with primary and secondary amines obtainable by the catalytic hydrogenation of aniline in a reaction zone in the presence of a hydrogenating catalyst at a temperature of about 150° to 400° C., separating the reaction mixture from the catalyst and distilling said mixture after removal of the remaining gaseous compounds by cooling, thereby leaving a distillation residue, the improvement which comprises treating the said distillation residue with steam and recycling said distillate to said reaction zone.

4. Method in accordance with claim 3 including treating the distillation residue remaining after the last mentioned distillation with steam thereby to obtain a further distillate, combining said further distillate with the first mentioned steam distillate and recycling the same to the reaction zone.

References Cited in the file of this patent

UNITED STATES PATENTS 2,387,617   Schmidt et al. _____ Oct. 23, 1945

FOREIGN PATENTS 998,266   France _____ Sept. 19, 1951

OTHER REFERENCES

Serial No. 309,303, Schmidt et al. (A.P.C.), published April 20, 1943 (abandoned).